United States Patent
Lee et al.

(10) Patent No.: US 6,198,514 B1
(45) Date of Patent: Mar. 6, 2001

(54) COLOR MISCONVERGENCE MEASUREMENT USING A COMMON MONOCHROME IMAGE

(75) Inventors: Kwang Wee Lee; Min Keat Wong, both of Singapore (SG)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/031,837

(22) Filed: Feb. 27, 1998

(51) Int. Cl.[7] .................................................... H04N 9/28
(52) U.S. Cl. ............................................ 348/807; 348/745
(58) Field of Search ................... 348/180, 184, 348/189, 190, 191, 657, 658, 745, 746, 747, 800, 806, 807, 181; 250/205; 315/368.11, 368.12; H04N 17/02, 3/22, 3/23, 3/26, 9/28

(56) References Cited

U.S. PATENT DOCUMENTS

| 4,316,211 | * | 2/1982 | Mackey et al. | 348/180 |
|---|---|---|---|---|
| 4,635,095 | * | 1/1987 | Legrand et al. | 348/191 |
| 4,642,529 | * | 2/1987 | Penn | 348/189 |
| 4,686,429 | * | 8/1987 | Fendley | 348/807 |
| 4,835,602 | * | 5/1989 | Duwaer | 348/746 |
| 4,988,857 | * | 1/1991 | Karasawa et al. | 250/205 |
| 5,032,769 | * | 7/1991 | Kawakami | 315/368.11 |
| 5,159,436 | * | 10/1992 | Soneira | 348/181 |
| 5,440,340 | * | 8/1995 | Tsurutani et al. | 348/190 |
| 5,497,054 | * | 3/1996 | Ryu | 315/368.11 |
| 5,602,932 | | 2/1997 | Macdonald et al. | 382/100 |
| 5,699,440 | * | 12/1997 | Carmeli | 348/180 |
| 5,835,135 | * | 11/1998 | Hamaguri et al. | 348/191 |
| 5,939,843 | * | 8/1999 | Kimoto et al. | 315/368.12 |

FOREIGN PATENT DOCUMENTS

| 0616473 A2 | 9/1994 | (EP) . |
|---|---|---|
| WO97/48232 | 12/1997 | (WO) . |

\* cited by examiner

Primary Examiner—Sherrie Hsia
(74) Attorney, Agent, or Firm—Burns, Doane, Swecker & Mathis, L.L.P.

(57) ABSTRACT

Accurate measurements of the misconvergence of a color CRT are obtained using a monochrome CCD camera or the like and a common image. In accordance with one embodiment of the invention, color misconvergence of a color video display is determined using a monochrome camera, by capturing a monochrome image of an output display displayed on the color video display. For each of multiple different colors, information from the monochrome image is processed to identify a displayed feature or feature pattern of that color, and a position of that displayed feature or feature pattern is determined. Then a difference in position of a feature or feature pattern of a first color and a feature or feature pattern of a second color is determined. The effects of color crosstalk, video/image jitter, and lens distortion are all eliminated or minimized.

11 Claims, 5 Drawing Sheets

Calculated Signal Reference = $0.5 \dfrac{(y1-y2)(x1^2-x3^2)-(y1-y3)(x1^2-x2^2)}{(y1-y2)(x1-x3)-(y1-y3)(x1-x2)}$

SHIFTED MASK PATTERNS   DISTINGUISHED COLOR FEATURES

COLOR MISCONVERGENCE MEASUREMENT USING A COMMON MONOCHROME IMAGE

BACKGROUND OF THE INVENTION

1. Field of the Invention

The present invention relates to the measurement of color misconvergence of color video displays.

2. State of the Art

Most current video display devices are color displays. In the case of a color CRT, phosphors of different primary colors (i.e., RGB) are excited by separate electron beam guns, the intensities of excitation of the respective colors being calculated to produce a particular resultant color at a particular color pixel as light from the different color phosphors combine. When only one color gun is turned on for a particular pixel, that pixel is perceived as having that color. When R, G and B color guns are all turned on at equal intensities for a particular pixel, that pixel is perceived as white. By varying the intensities of the color guns in combination at a particular pixel, any of a very large number of colors may be produced at that pixel.

By scanning the color guns of a color CRT across the face of the CRT tube in a raster pattern, pixels throughout the viewing area of the CRT may be "painted" various colors. For proper color reproduction, the three separate color guns must act precisely in concert. The failure of the three separate color guns to act precisely in concert is referred to as "misconvergence," i.e., the failure of the electron beams to converge at a single color pixel, and results in the wrong color being displayed. Misconvergence may have both a horizontal component and a vertical component.

Good convergence is of paramount importance for a high-quality color video display. Misconvergence must therefore be tested and corrected for. Two different types of testing are performed, evaluation testing and production testing. During evaluation testing, misconvergence measurements are performed over an extended period of time under various operating conditions. In this manner, test results indicative of expected convergence performance over the life of the color video display may be obtained.

A conventional test setup for obtaining misconvergence measurements is shown in FIG. 1. A test computer includes a CPU, a monitor and a camera module disposed opposite a Unit Under Test (UUT). The computer is equipped with a video display card coupled to the UUT and an image capture card coupled to the camera module. A test image is displayed on the UUT, the display being imaged by the camera module. Images from the camera module are captured by the image capture card and processed by the CPU to obtain misconvergence measurements, which may then be displayed on the monitor for viewing by an operator.

The camera module may include a color CCD camera or a photodiode or a monochrome CCD camera. One color camera system that has been used for obtaining misconvergence measurements is the Minolta CC100 CRT convergence meter. Using such a system, information from each color signal is separated and a misconvergence result is calculated, e.g., by determining the positions of the individual color signals in the time domain in one frame. A similar approach may be used in the case of a photodiode sensor. Another prior-art method of obtaining misconvergence measurements uses a monochrome CCD camera and two patterns, Pattern 1 and Pattern 2. For Pattern 1, one color at a time is flickered on the screen, requiring three image capture operations to obtain all the required information. Pattern 2 is a grid pattern having red, green and blue portions. Information for each color is determined from prior knowledge of the three color portions. Using the information for each color, misconvergence results are calculated.

These prior-art methods suffer from various disadvantages. If a color CCD camera is used, color crosstalk produces measurement errors. If multiple images taken at different instants of time are used, measurement errors occur as a result of video/image jitter. In the case of a color grid display, Red, Green and Blue data are taken from different points of the image, such that the result calculated does not relate to the actual point of measurement, and the effect of lens distortion on the image can be significant.

Accordingly, there is needed an improved method of obtaining misconvergence measurements that overcomes the foregoing disadvantages.

SUMMARY OF THE INVENTION

Accurate measurements of the misconvergence of a color CRT are obtained using a monochrome CCD camera or the like and a common image. In accordance with one embodiment of the invention, color misconvergence of a color video display is determined using a monochrome camera, by capturing a monochrome image of an output display displayed on the color video display. For each of multiple different colors, information from the monochrome image is processed to identify a displayed feature or feature pattern of that color, and a position of that displayed feature or feature pattern is determined. Then a difference in position of a feature or feature pattern of a first color and a feature or feature pattern of a second color is determined. The effects of color crosstalk, video/image jitter, and lens distortion are all eliminated or minimized.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Method of obtaining horizontal and vertical misconvergence measurements will first be described in which a display feature of a primary color used as a background display color is distinguished by its brightness characteristic. During this description, it will be assumed that, having identified a display feature of the background primary color, display features of the remaining primary colors can also be distinguished.

Later a description will be given of the manner in which the distinguishing of display features of the remaining primary colors may be carried out for two different types of color displays, a first Trinitron™-type display and a second shadow-mask-type display. In the case of the first type of display, phosphors of different primary colors are arranged in continuous vertical stripes throughout the display area. In the case of the second type of display, phosphor dots of different primary colors are arranged in a pattern in rows, with the pattern being offset from one row to the next. Dots within every other row are vertically aligned and, for a given X distance, are of the same color.

Figure 2:
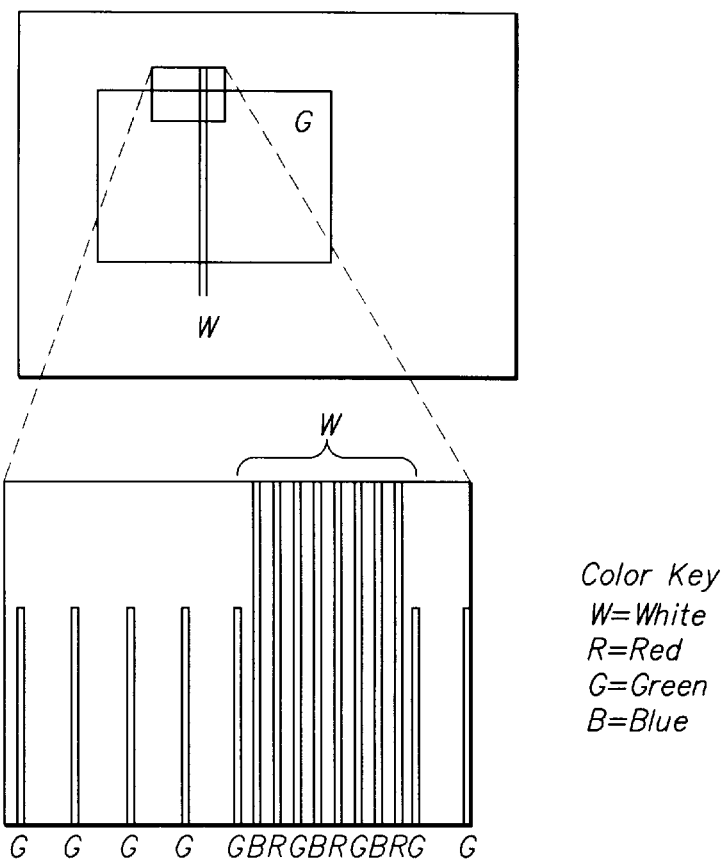
FIG. 2 is a diagram of a display pattern used to obtain a horizontal misconvergence measurement.
Figure 4:
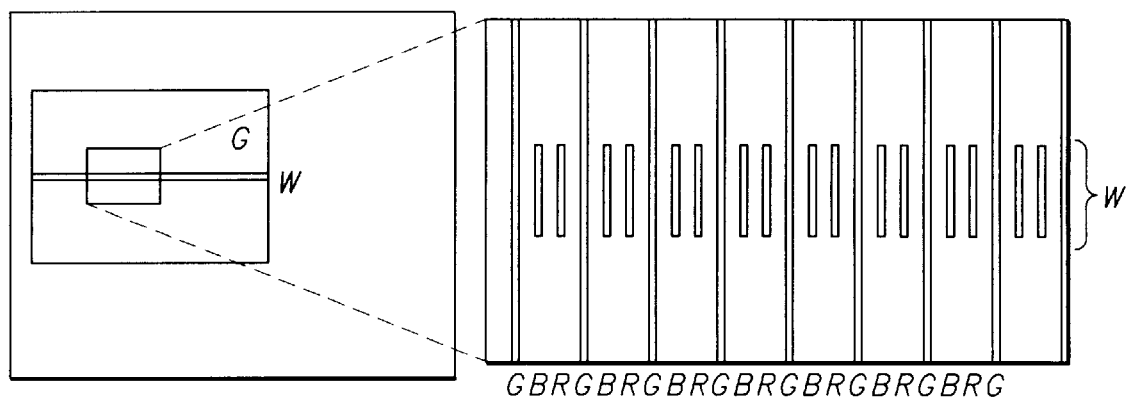
FIG. 4 is a diagram of a display pattern used to obtain a vertical misconvergence measurement.

Referring to FIG. 2, to obtain horizontal misconvergence measurements, a white vertical line is displayed that extends across and beyond a rectangular background region of a primary color, e.g., green. The background color used should be one of the three primary colors and should be lower in brightness compared to the brightness of the white line. A portion of the display image is shown in enlarged view assuming the first type of color display. Within the area of the background region, green phosphors only are excited, creating the appearance in close-up view of a series of green vertical stripes. Within the area of the white line, phosphors of all three primary colors are excited with equal intensity, creating the appearance in close-up view of alternating red, green and blue stripes.

To obtain horizontal misconvergence measurements, a monochrome image of the output display pattern of FIG. 2 is captured. Then, the brightness information of a particular row is read. Within the area of the white line, the brightness of green sub-pixels will exceed that of red and blue sub-pixels because of the contribution of illumination from green sub-pixels in the adjoining background area. Hence, green color information may be identified and, by extension, color information for each of the primary colors may be identified as described hereinafter. Color information for each of the three color components within the selected row is therefore extracted.

Figure 1:
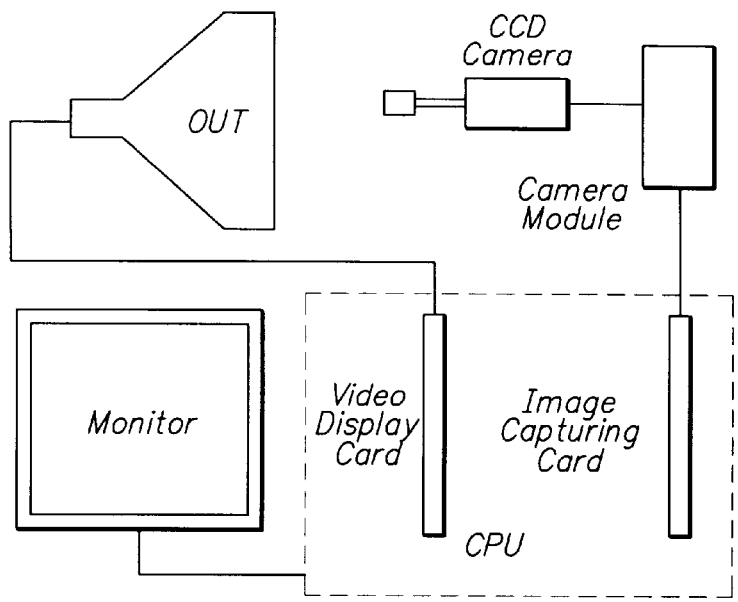
FIG. 1 is a block diagram of a conventional test setup for obtaining misconvergence measurements.
Figure 3:
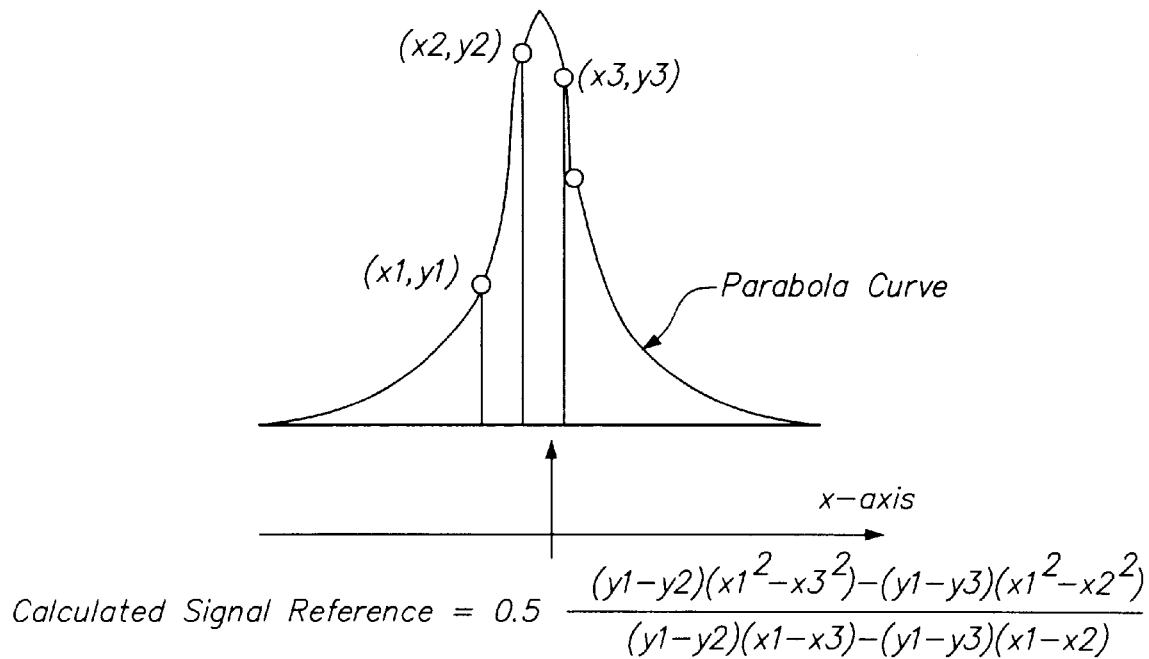
FIG. 3 is a diagram of a parabolic curve used to calculate horizontal misconvergence.

For each set of color information, the three highest valued points in the row of interest, in terms of brightness, are identified. (Note that, in the illustrated embodiment, the white vertical line is two or more pixels wide.) For each of the three points, the position of the point is treated as an X value and the brightness of the point is treated as a corresponding Y value. Using the three points, a parabolic curve is then constructed to approximate the actual Gaussian curve, and the color reference signal for the color component is calculated as the position of the peak of the parabola as illustrated in FIG. 3 using the following quantity, for example, as the calculated signal reference:

$$0.5[(y1-y2)(x1^2-x3^2)-(y1-y3)(x1^2-x2^2)]/[(y1-y2)(x1-x3)-y1-y3)(x1-x2)]$$

Having obtained the color reference signals R, G and B for each of the three color components, the horizontal misconvergence is calculated as B-R, B-G, and R-G.

The horizontal misconvergence measurement may be performed at intervals over an extended period of time of continuous operation of the CRT. For each image captured, a complete set of horizontal misconvergence measurements may be obtained.

Vertical misconvergence measurement, although performed in a similar manner, is slightly more involved. Again, a white line (now horizontal) is displayed on a background region of a primary color, e.g., green. A portion of the display image is shown in enlarged view assuming the first type of color display. Within the area of the background region, green phosphors only are excited, creating the appearance in close-up view of a series of green vertical stripes. Within the area of the white line, phosphors of all three primary colors are excited with equal intensity, creating the appearance in close-up view of alternating red, green and blue stripes. Again, within the area of the white line, the brightness of green sub-pixels will exceed that of red and blue sub-pixels because of the contribution of illumination from green sub-pixels in the adjoining background area. Hence, green color information may be identified and, by extension, color information for each of the primary colors may be identified as described hereinafter.

Figure 5:
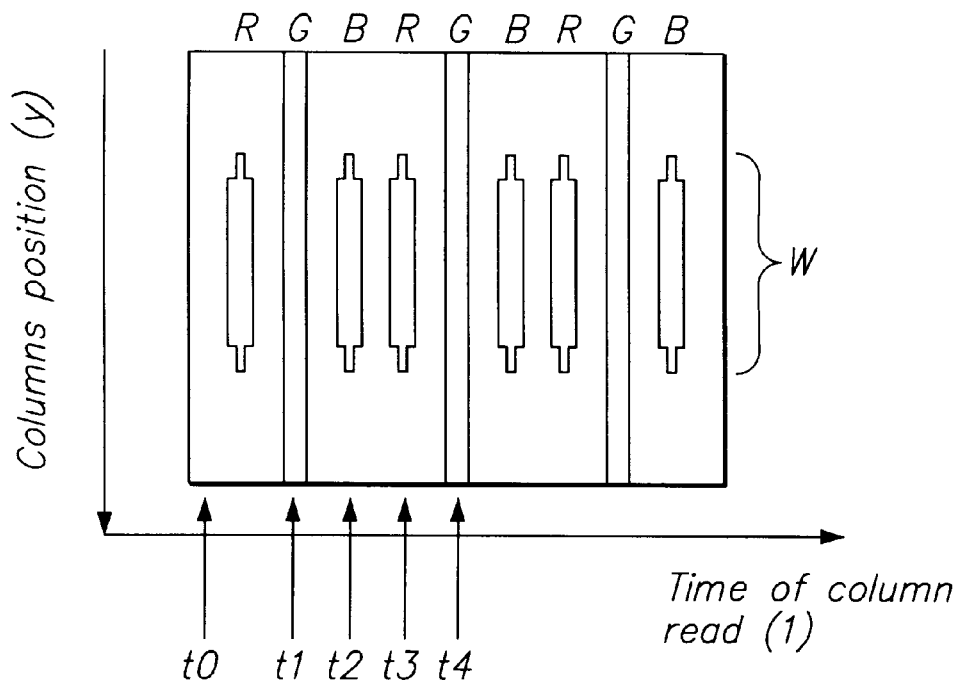
FIG. 5 is a diagram of an enlarged portion of the display pattern of FIG. 4, in relation to coordinate axes used in calculating vertical misconvergence.

First, a row read operations is performed, and an X position corresponding to a background color stripe is chosen. Then, successive column read operations are performed, from the reference background color stripe to a next background color stripe (in the +X direction), as shown in FIG. 5. To illustrate the sequential nature of the column read operations, image data corresponding to the column reads is identified by the time of the column read operation, i.e., t0, t1, t2, etc.

Figure 6:
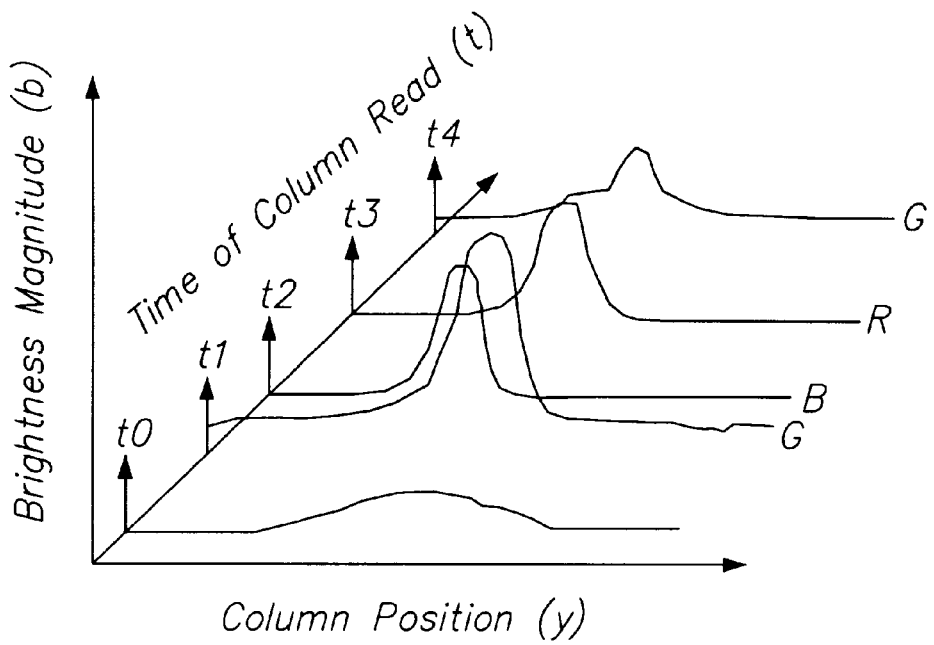
FIG. 6 is a three-dimensional view of data obtained during vertical misconvergence processing.
Figure 7:
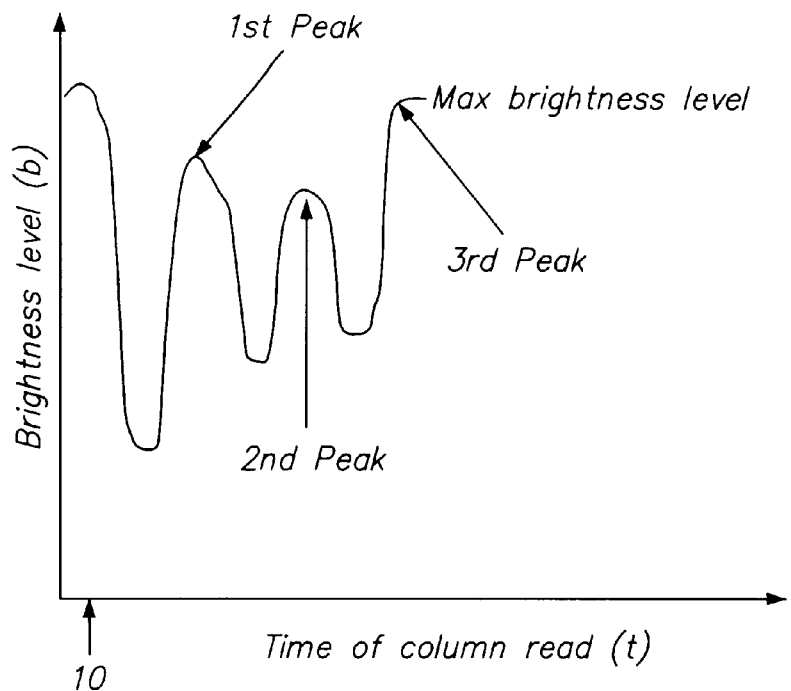
FIG. 7 is a graph of the maximum brightness level of data corresponding to successive columns.

Brightness variations in the course of each "columnar scan" may be plotted in three dimensions as shown in FIG. 6. Variations in maximum brightness from scan to scan may be plotted in two dimensions as shown in FIG. 7. Brightness is greatest at the center of each color signal and falls off nearer the edges. The plot of FIG. 7 therefore shows a series of peaks and valleys. In particular, three consecutive peaks may be observed, representing the vertical convergence reference of the respective color signals.

Figure 8:
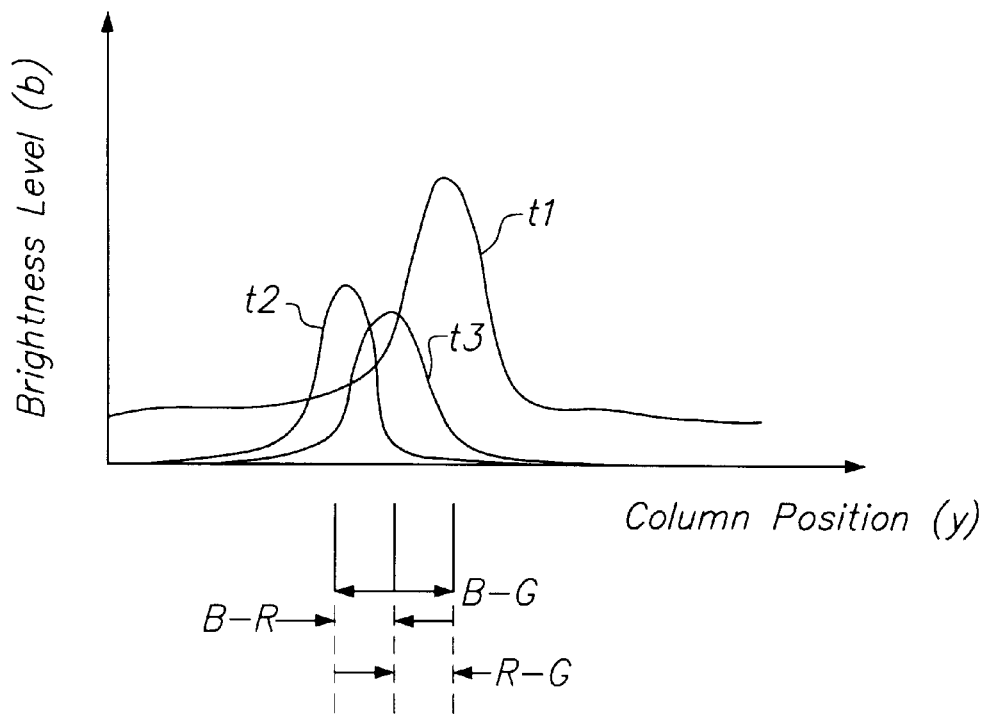
FIG. 8 is a diagram illustrating the manner in which vertical misconvergence measurements are obtained.

A plot of column brightness data for columns corresponding to the respective peaks of FIG. 7 is shown in FIG. 8. Note that one of the peaks exhibits background brightness. This peak if therefore of the background color, which is known. And, as mentioned previously, having distinguished the color for the signal of greatest brightness, the remaining color components can distinguished from their sequence of appearance with respect to the identified signal, using a known pattern in which the color component signals appear on the CRT. For example, in the case of the first type of display, if the brightest peak is green (the background color), then the next peak in the direction of increasing (t) will be blue, followed by red.

The colors of the respective peaks having been this distinguished, difference signals may be formed between the column positions of the respective peaks, yielding the desired vertical misconvergence measurements. The vertical misconvergence measurement may be performed at intervals over an extended period of time of continuous operation of the CRT. For each image captured, a complete set of vertical misconvergence measurements may be obtained.

Having described the manner in which horizontal and vertical misconvergence measurements are obtained when features of the respective primary colors have been distinguished, the manner in which the primary colors of the features may be distinguished within a monochrome display image will now be described for both a first type of display and a second type of display.

Figure 9:
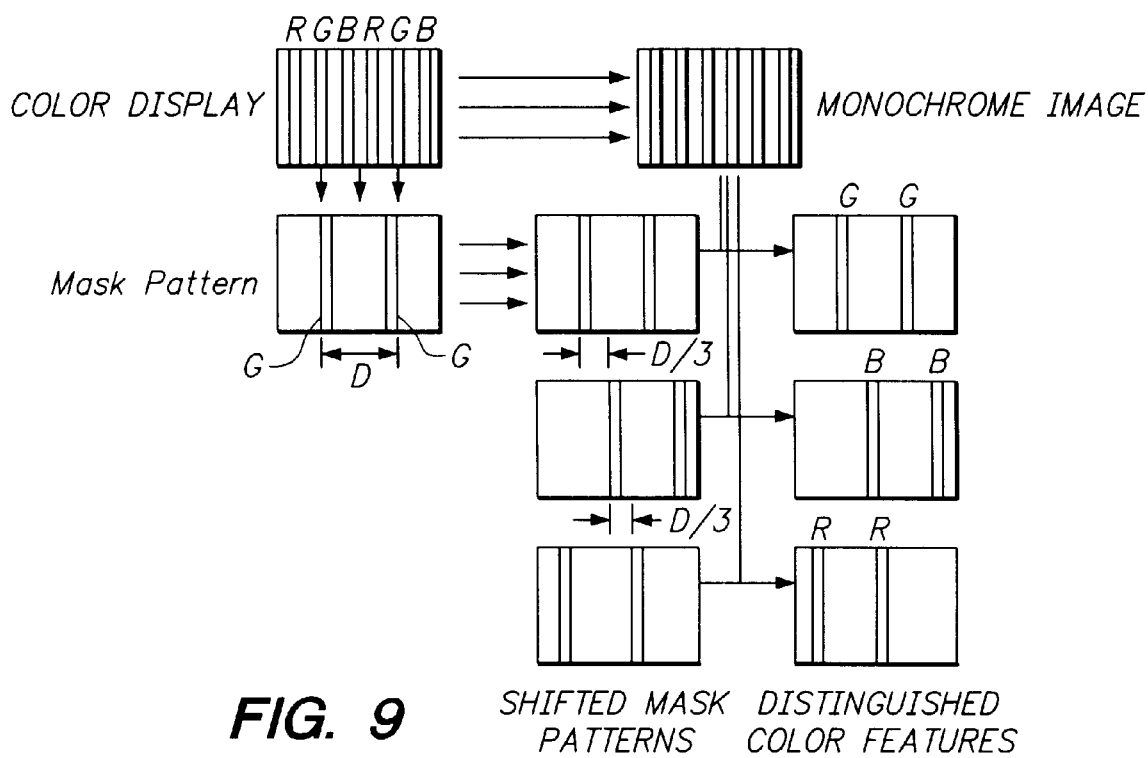
FIG. 9 is a diagram illustrating how features of different colors may be distinguished from a monochrome image of a first type of color display.

Referring to FIG. 9, in the case of the first type of display (Trinitron™ display), consecutive stripes of a given primary color occur at a fixed horizontal pitch D. Different color stripes therefore occur at a horizontal pitch D/3 in a fixed color sequence R, G, B. Once a color stripe of one color has been distinguished, color strips of the remaining colors may also be distinguished based on their relative position to the color stripe of the first color.

Figure 10:
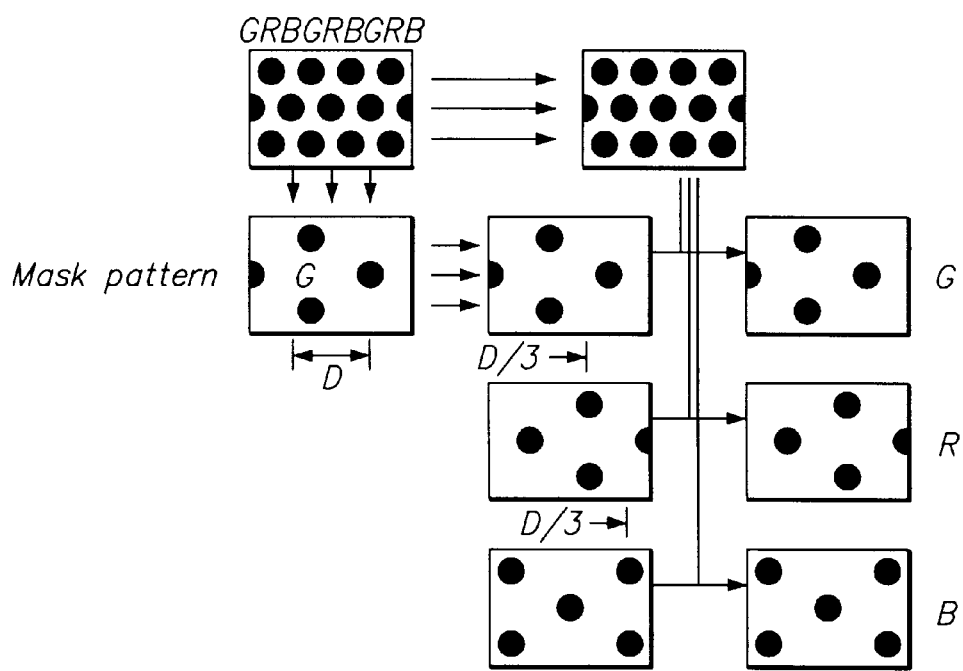
FIG. 10 is a diagram illustrating how features of different colors may be distinguished from a monochrome image of a second type of color display.

Referring to FIG. 10, the same principle may be applied to the second type of display (shadow mask). The only difference is that instead of continuous vertical stripes of a color, the stripes are dotted.

The present method of obtaining misconvergence measurements, because misconvergence information is obtained at the same instant in time, eliminates measurement errors caused by video/image jitter. Furthermore, because a monochrome camera is used, the effects of color crosstalk in a color CCD camera are eliminated. Finally, because the focus distance for a monochrome CCD camera can be very short, the effects of camera lens distortion on the image are reduced.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of determining color misconvergence of a color video display using a monochrome camera, the method comprising the steps of:

capturing a single monochrome image of an output display displayed on the color video display;

for each of a plurality of different colors, distinguishing a displayed feature or feature pattern of that color by processing information from the single monochrome image, and determining a position of said displayed feature or feature pattern; and determining a difference in position of a feature or feature pattern of a first color and a feature or feature pattern of a second color.

2. The method of claim 1, wherein the output display includes a background region of a background color that is a primary color and a white line extending across the background region.

3. The method of claim 2, wherein a brightness of the white line is greater than a brightness of the background region.

4. The method of claim 2, wherein distinguishing comprises distinguishing a feature or feature pattern of said background color based on a brightness characteristic thereof.

5. The method of claim 4, wherein distinguishing further comprises distinguishing features or feature patterns of remaining primary colors based on positional relationships of those features or feature patterns to said feature or feature pattern of said background color.

6. The method of claim 2, wherein horizontal misconvergence is determined, with the white line being a vertical white line, and wherein said feature pattern is a group within said image of at least three pixels of a given primary color having substantially the highest brightness of all pixels of that color within a row of image pixels.

7. The method of claim 6, wherein the position of the group of pixels is determined in a weighted fashion taking into account the relative brightness of the pixels.

8. The method of claim 7, wherein the position of the group of pixels is determined to be the peak of a curve passing through the points x1, y1; x2, y2; and x3, y3; wherein x1, x2 and x3 correspond, respectively, to the x position of the pixels and y1, y2 and y3 correspond, respectively, to the brightness of the pixels.

9. The method of claim 8, wherein the curve is a parabola.

10. The method of claim 2, wherein vertical misconvergence is determined, with the white line being a horizontal white line, and wherein said feature is a pixel of a given primary color having substantially the highest brightness of all pixels of that color within a vertical swath of image pixels.

11. The method of claim 1, wherein said monochrome image is captured using a monochrome CCD camera.

\* \* \* \* \*